(12) United States Patent
Gutmann et al.

(10) Patent No.: US 8,308,131 B2
(45) Date of Patent: Nov. 13, 2012

(54) BALL VALVE STEM RETAINING SYSTEM

(75) Inventors: Paul M. Gutmann, Katy, TX (US);
John M. Saldivar, Richmond, TX (US)

(73) Assignee: Cameron International Corporation, Houston, TX (US)

( * ) Notice: Subject to any disclaimer, the term of this patent is extended or adjusted under 35 U.S.C. 154(b) by 583 days.

(21) Appl. No.: 12/553,037

(22) Filed: Sep. 2, 2009

(65) Prior Publication Data
US 2011/0049408 A1 Mar. 3, 2011

(51) Int. Cl.
*F16K 5/06* (2006.01)
(52) U.S. Cl. .................. 251/214; 251/315.01
(58) Field of Classification Search ..... 251/315–315.16, 251/214
See application file for complete search history.

(56) References Cited

U.S. PATENT DOCUMENTS

| | | | |
|---|---|---|---|
| 2,585,658 A * | 2/1952 | Keller | 251/363 |
| 3,172,192 A * | 3/1965 | Dresden | 29/890.127 |
| 3,269,692 A | 8/1966 | Shafer | |
| 3,501,128 A * | 3/1970 | Pool | 251/315.16 |
| 3,589,674 A * | 6/1971 | Jones | 251/121 |
| 3,737,145 A * | 6/1973 | Heller et al. | 251/309 |
| 4,180,244 A * | 12/1979 | Rosenitsch | 251/309 |
| 4,519,412 A * | 5/1985 | Grazioli | 137/72 |
| 5,868,378 A * | 2/1999 | McMahon et al. | 251/315.13 |
| 6,202,668 B1 * | 3/2001 | Maki | 137/72 |
| 6,669,171 B1 | 12/2003 | Stunkard | |
| 6,874,757 B2 | 4/2005 | Hallett | |
| 6,988,709 B2 | 1/2006 | Scaramucci | |
| 7,347,408 B2 * | 3/2008 | Keiser | 251/315.08 |

FOREIGN PATENT DOCUMENTS

| | | |
|---|---|---|
| DE | 2161238 | 6/1973 |
| DE | 8435773 | 5/1986 |
| GB | 691216 | 5/1953 |
| WO | WO0184028 | 11/2001 |

* cited by examiner

*Primary Examiner* — John Bastianelli
(74) *Attorney, Agent, or Firm* — Fletcher Yoder P.C.

(57) ABSTRACT

A system, in certain embodiments, includes a ball valve including a body and a ball disposed within the body. The ball valve also includes a stem disposed within an opening in the ball. The stem is removable by passage through the opening into a bore of the ball.

20 Claims, 7 Drawing Sheets

BALL VALVE STEM RETAINING SYSTEM

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves may be employed to regulate a flow of fluid in a variety of applications. Ball valves typically include a body, a ball disposed within the body, and a stem rotationally coupled to the ball. During ball valve maintenance, the stem may be removed to service various components within the ball valve, such as bushings, bearings and seals. Unfortunately, certain ball valves may need to be disassembled prior to removal of the stem. Due to the large number of fasteners typically employed within a ball valve, such disassembly may be both expensive and time-consuming. Consequently, maintenance operations may be performed at longer than desired intervals, resulting in inefficient valve operation.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure may significantly reduce the duration and costs associated with ball valve maintenance operations by providing an internally retained stem that may be removed from the valve without uncoupling the closures. As will be appreciated, ball valves may include stems that are internally or externally retained. Externally retained stems include certain features external to the valve body configured to restrict movement of the stem away from the ball during operation. For example, certain externally retained stems include a ridge disposed about the circumference of the stem. Movement of the stem away from the ball is blocked by contact between the ridge and a plate bolted to the body. To extract the stem for maintenance, the plate may be unbolted and removed. Unfortunately, ball valves including externally retained stems are expensive to manufacture due to the additional parts associated with retaining the stem and configuring the valve body to accommodate the stem retention plate. Additionally, during disassembly and repair operations, residual fluid pressure within the valve may cause the stem to be ejected from the valve at high speed when the plate is unbolted and removed.

Alternatively, ball valves may include internally retained stems. In such valves, the stem may include a ridge disposed about the circumference of the stem, similar to the externally retained stems. However, movement of the stem away from the ball is blocked by contact between the ridge and an inner surface of the valve body. In this configuration, the stem may not be removed by extracting the stem in a direction away from the valve. Instead, the stem may be removed by translating the stem into the body. Unfortunately, because the ball is disposed within the body, the ball must be removed prior to extracting the stem. The process of removing the ball generally involves uncoupling at least one closure, each closure being disposed to opposite longitudinal ends of the body. Due to the large number of fasteners that secure the closures to the body, this process may be time-consuming and expensive.

Consequently, the disclosed embodiments include an internally retained stem configured to pass through an opening within the ball. In this manner, the stem may be removed from the valve without uncoupling the closures from the body. Specifically, certain embodiments include a stem having a retainer disposed about a circumference of the stem. The retainer is configured to block inward movement of the stem via contact between the retainer and an outer surface of the body. Removal of the retainer facilitates movement of the stem to a position entirely within the ball, thereby enabling the stem to be removed through the valve fluid passage. Such a configuration reduces the duration and costs associated with ball valve maintenance, because the closures may remain coupled to the body.

Figure 1:
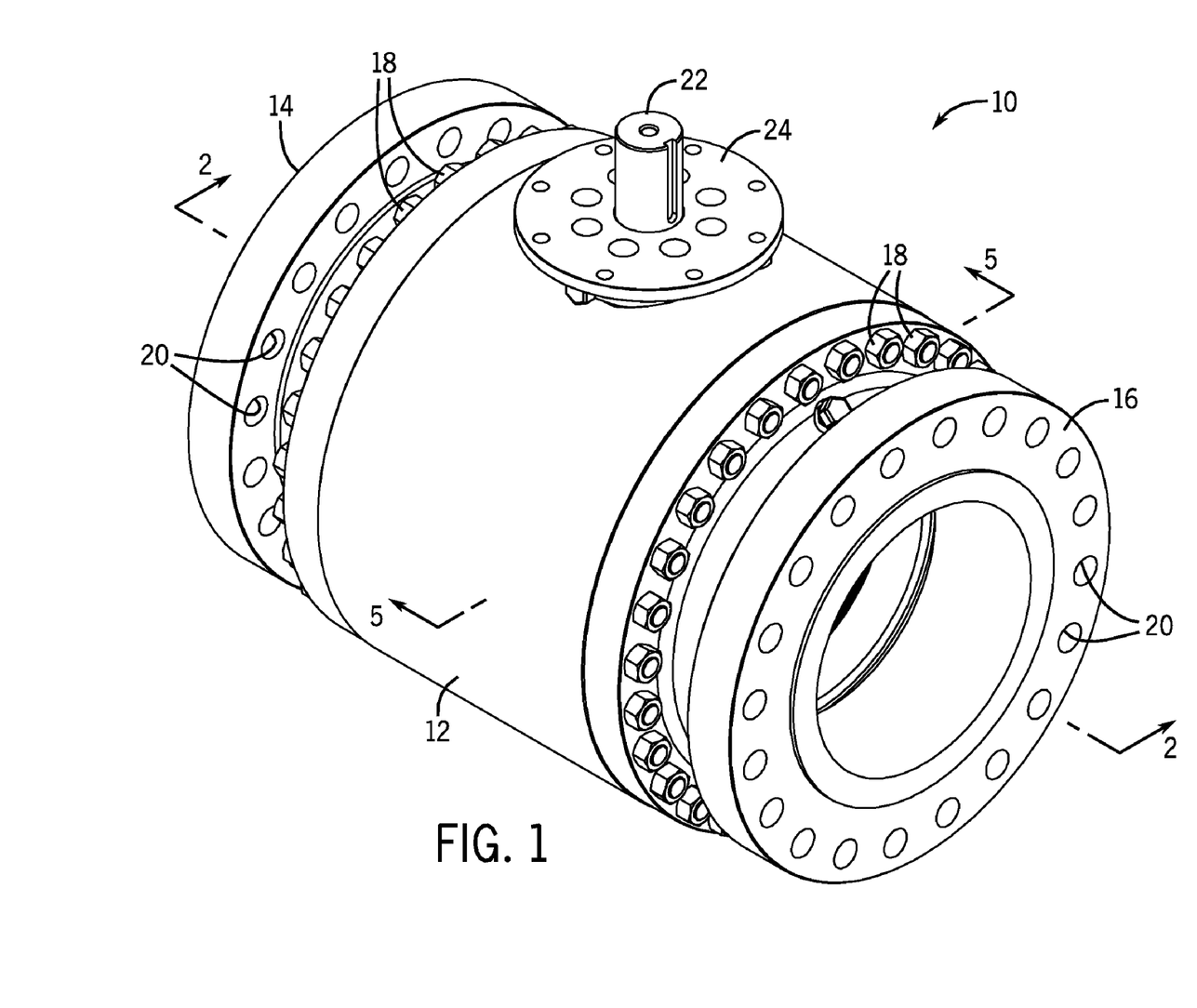
FIG. 1 is a perspective view of a ball valve having an internally retained stem configured to be removed without separating closures from the body in accordance with certain embodiments of the present technique.

FIG. 1 is a perspective view of a ball valve 10 configured to regulate a flow of fluid. As illustrated, the ball valve 10 includes a body 12 (e.g., hollow cylindrical body), a first closure 14 and a second closure 16. The closures 14 and 16 are configured to seal the body 12 and secure the valve 10 to fluid conduits. The closures 14 and 16 are coupled to the body 12 by multiple fasteners 18. In the present configuration, each fastener 18 includes a threaded rod (e.g., bolt) disposed within a complementary threaded recess within the body 12. The threaded rods pass through openings within the closures 14 and 16, and are secured by nuts. The nuts serve to securely fasten the closures 14 and 16 to the body 12. As will be appreciated, the number of fasteners 18 may be selected to provide a proper seal between the closures 14 and 16 and the body 12. Specifically, the fasteners 18 are configured to substantially reduce the formation of gaps between the closures 14 and 16 and the body 12 that may cause fluid to leak from the valve 10. For example, in certain embodiments, each closure 14 and 16 may be coupled to the body 12 by more than 3, 5, 10, 15, 20, 25, 30, 35, 40, 45, 50, or more fasteners 18. In an alternative embodiment, the closures 14 and 16 are secured to the body 12 by a welded connection. In such an embodiment, the fasteners 18 may be omitted.

Each closure 14 and 16 includes multiple openings 20 configured to couple each closure 14 and 16 to a fluid conduit. As will be appreciated, fasteners may pass through the openings 20 and corresponding openings within respective conduits to secure the closures 14 and 16 to the conduits. The number of openings may be selected to substantially reduce the possibility of fluid leakage between the closures 14 and 16 and the conduits. For example, the closures 14 and 16 may include more than 3, 5, 10, 15, 20, 25, 30, 35, 40, 45, 50, or more openings 20.

As discussed in detail below, the valve 10 includes a ball configured to rotate from an open position to a closed position. The ball includes a bore that facilitates the passage of fluid through the valve 10. In the open position, the bore of the ball is aligned with a bore of each closure 14 and 16 such that fluid may pass through the valve 10. In the closed positioned, the bore is rotated perpendicular to the closures 14 and 16, thereby substantially blocking the passage of fluid through the valve 10. As will be appreciated, rotating the ball to an orientation between the open and closed positions may establish a desired flow rate of fluid through the valve 10 by adjusting the fluid passage area. The ball is rotationally coupled to a stem 22 such that rotation of the stem 22 causes the ball to rotate. Furthermore, the stem 22 is coupled to an adapter plate 24 configured to mount with a variety of valve control components. For example, the adapter plate 24 may be mounted to an electric or hydraulic actuator configured to remotely control the position of the ball within the valve 10. Alternatively, the adapter plate 24 or stem 22 may be coupled to a handle such that the valve 10 may be operated manually.

As discussed in detail below, the stem 22 is configured to be removed from the valve 10 without uncoupling the closures 14 and/or 16 from the body 12. Due to the large number of fasteners 18 that couple the closures 14 and 16 to the body 12, the process of removing the closures 14 and 16 may be time-consuming. Consequently, the stem 22 of the present embodiment may be removed from the valve 10 without uncoupling the fasteners 18. Specifically, the stem 22 may be retained by a removable retainer configured to block inward movement of the stem 22. Once the retainer has been removed, the stem 22 may pass through the body 12 and enter the ball. Because the length of the stem 22 is limited with respect to an inner diameter of the ball, the stem 22 may be removed through either closure 14 or 16. For example, the length of the stem 22 may be less than the inner ball diameter. Alternatively, the length of the stem 22 may be limited such that it may enter the ball at an angle (i.e., canted orientation). This removal process may significantly reduce the time associated with stem removal, thereby significantly reducing the cost of maintenance operations.

Figure 2:
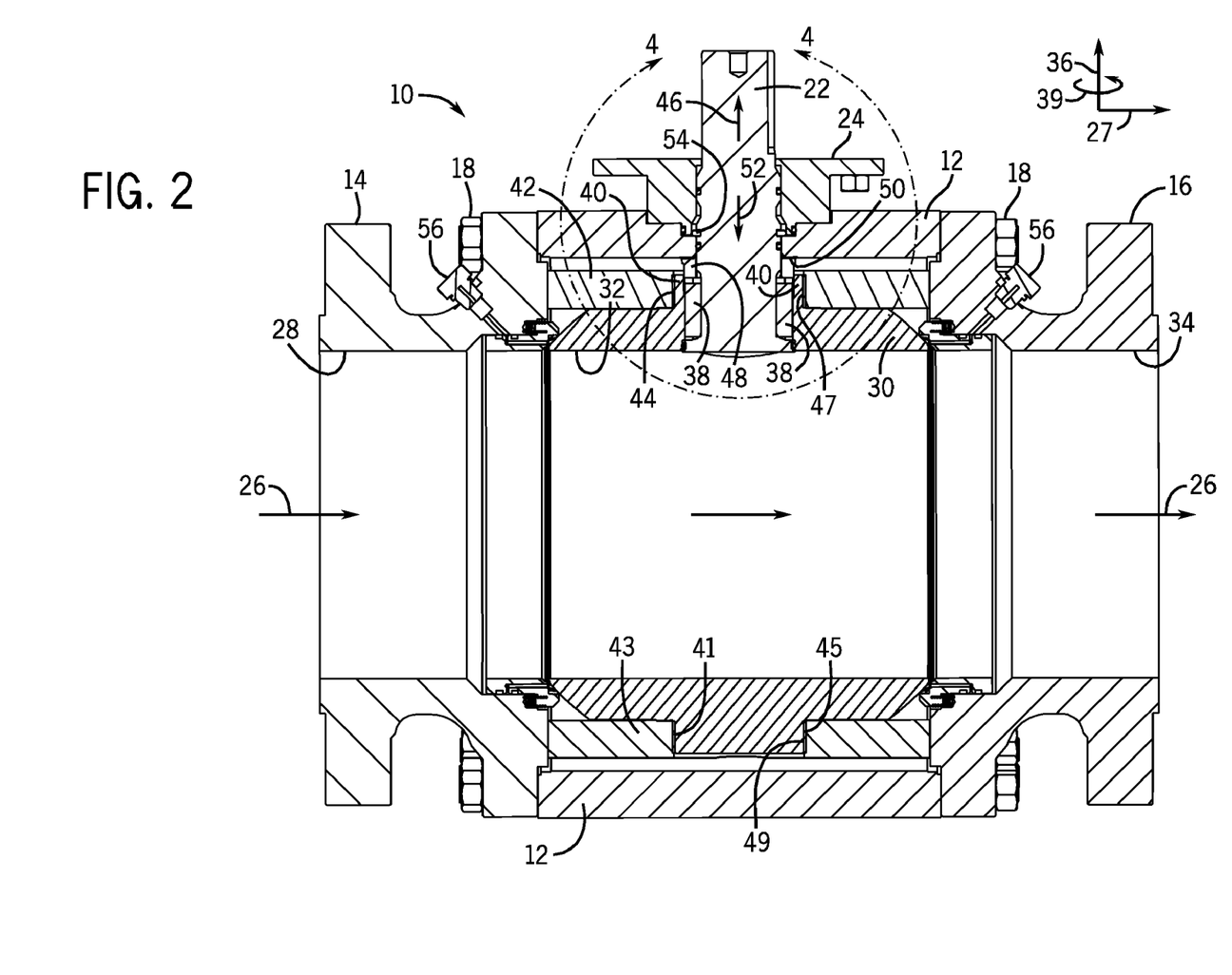
FIG. 2 is a cross section of an exemplary ball valve, taken along line 2-2 of FIG. 1, in accordance with certain embodiments of the present technique.

FIG. 2 is a cross section of an exemplary ball valve 10, taken along line 2-2 of FIG. 1. As illustrated, the valve 10 is in the open position, thereby facilitating a flow of fluid 26 in an axial direction 27. Specifically, the fluid enters a bore 28 of the first closure 14, flows through a bore 32 of a ball 30, and exits a bore 34 of the second closure 16. As previously discussed, the ball 30 may rotate about a radial axis 36 to regulate the flow of fluid 26 through the valve 10. Rotating the ball 30 varies the flow area between the bore 32 and the closures 14 and 16, thereby adjusting the flow rate of fluid 26. To facilitate rotation of the ball 30, the stem 22 is rotationally coupled to the ball 30 by dowels 38. While two dowels 38 are illustrated in the present embodiment, it should be appreciated that more or fewer dowels 38 may be employed in alternative embodiments. For example, certain embodiments may include 1, 2, 3, 4, 5, 6, 7, 8, or more dowels 38 disposed about the stem 22 in a circumferential direction 39. In an alternative embodiment, the stem 22 may be rotationally coupled to the ball 30 by a spline connection.

The ball 30 includes a first trunnion 40 that extends in the radial direction 36. The first trunnion 40 is configured to mount within a first trunnion block 42. Similarly, the ball 30 includes a second trunnion 41 disposed within a second trunnion block 43. The trunnion blocks 42 and 43 serve to orient the ball 30 within the body 12. As discussed in detail below, the trunnion blocks 42 and 43 are secured to the body 12 and include openings 47 and 49 configured to receive the first trunnion 40 and second trunnion 41, respectively. Specifically, the trunnions 40 and 41 have circular cross sections configured to mount within circular openings 47 and 49 within the trunnion blocks 42 and 43. Because the trunnion blocks 42 and 43 are secured to the body 12, the ball 30 may rotate within the trunnions 40 and 41 when driven to rotate by the stem 22. To facilitate rotation, a first trunnion bearing 44 is disposed between the first trunnion 40 and the opening 47 within the first trunnion block 42, and a second trunnion bearing 45 is disposed between the second trunnion 41 and the opening 49 within the second trunnion block 43. As will be appreciated, the bearings 44 and 45 may reduce rotational resistance of the ball 30.

During operation of the valve 10, the stem 22 is retained such that movement along the radial direction 36 is blocked. Specifically, movement of the stem 22 along an outward radial direction 46 away from the ball 30 is blocked by contact between the stem 22 and the body 12. In other words, the stem 22 is internally retained by the body 12. As will be appreciated, fluid pressure within the ball 30 may exert a force on the stem 22 in the direction 46. For example, the fluid pressure may be approximately between 0 to 15,000, 0 to 5625, 0 to 3750, 0 to 2000, or about 0 to 290 psi. In certain embodiments, the area of the stem 22 exposed to the fluid within the ball 30 may be approximately between 0.5 to 4, 1 to 3, or about 2 square inches. Therefore, if the pressure within the ball 30 is approximately 4000 psi and the area of the stem 22 is approximately 2 square inches, the fluid may exert a force of approximately 8000 pounds on the stem 22 in the direction 46. Consequently, the present embodiment includes a thrust bushing 48 and thrust washer 50 to facilitate rotation of the stem 22 relative to the body 12 despite the large contact force between the stem 22 and the body 12. As discussed in detail below, the thrust bushing 48 and thrust washer 50 are disposed about the circumference of the stem 22 between a raised portion (not shown) of the stem 22 and the body 12.

Furthermore, the stem 22 is retained along an inward radial direction 52 by a retainer 54 (e.g., c-shaped retainer). As discussed in detail below, the retainer 54 is disposed within a recess (e.g., annular groove) of the stem 22, and contacts an outer surface of the body 12, thereby blocking movement of the stem 22 in the inward radial direction 52. As will be appreciated, other retention configurations, such as snap-type rings or fixed collars, among others, may be employed in alternative configurations. In further embodiments, the stem 22 may be retained by contact between one or more seals disposed between the stem 22 and body 12. During maintenance operations, the adapter plate 24 may first be removed from the valve 10, thereby exposing the retainer 54. Because the stem 22 is internally retained, the stem 22 may remain secured within the valve 10 despite removal of the adapter plate 24. The retainer 54 may then be removed to enable the stem 22 to move in the direction 52. Once the stem 22 is entirely within the bore 32 of the ball 30, the stem 22 may be extracted from the valve 10 through the first closure 14 or the second closure 16. In this manner, the stem 22 may be removed from the valve 10 without removal of the ball 30, the first closure 14, or the second closure 16. As previously discussed, because removing the closures 14 and/or 16 may involve uncoupling a large number of fasteners 18, the present embodiment may reduce the duration of maintenance operations compared to configurations in which the closures 14 and/or 16 are removed to facilitate extraction of the stem 22. Furthermore, as illustrated, the valve 10 includes grease injection ports 56 disposed within each closure 14 and 16 to provide lubricating grease to various components within the valve 10.

Figure 3:
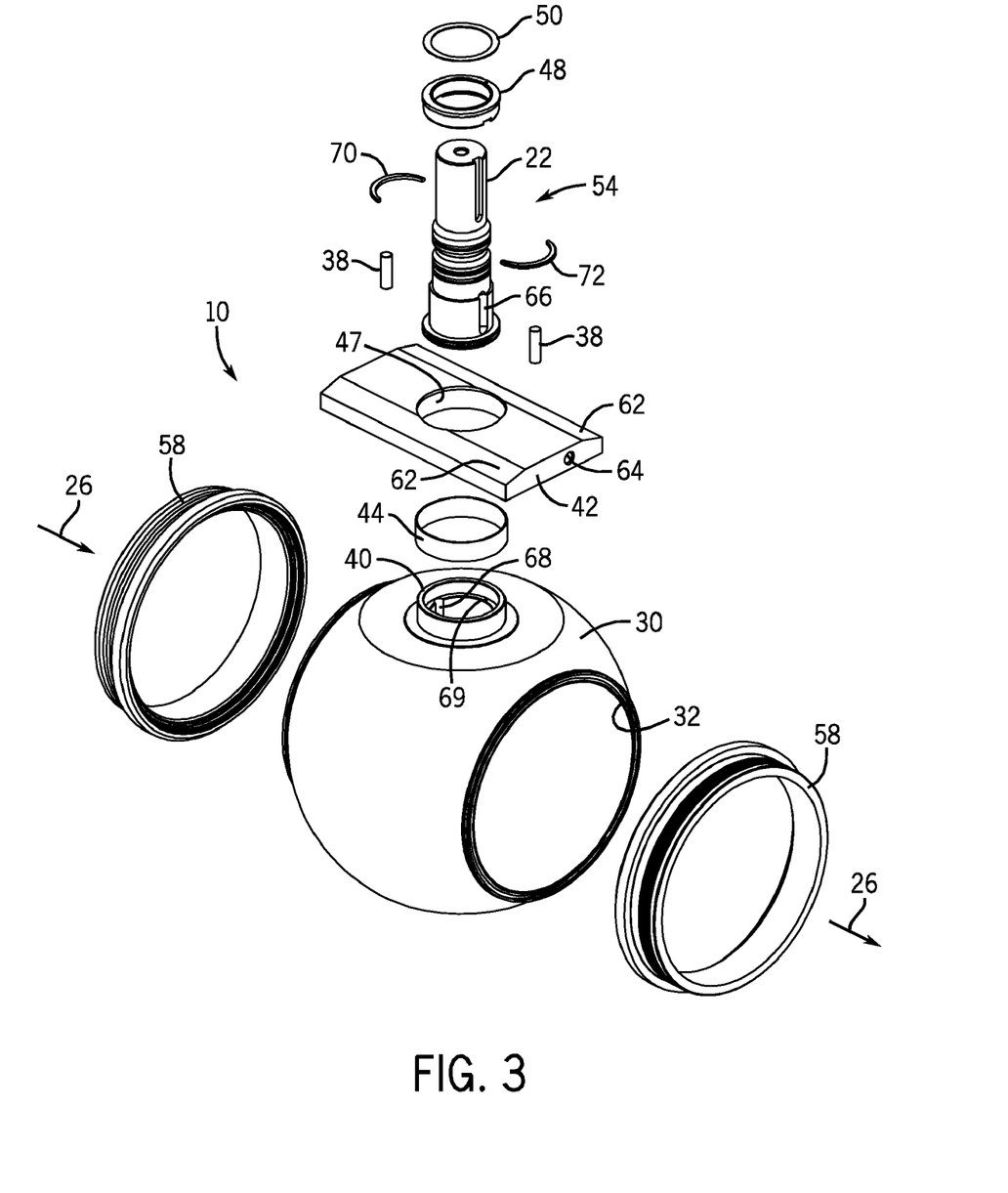
FIG. 3 is an exploded view of internal components within an exemplary ball valve, as shown in FIG. 1, in accordance with certain embodiments of the present technique.

FIG. 3 is an exploded view of internal components within an exemplary ball valve 10, as shown in FIG. 1. As illustrated, the ball 30 is oriented in an open position such that fluid 26 may flow through the bore 32. In the present embodiment, a seat 58 (e.g., annular seal) is disposed on each end of the bore 32 to provide a seal between the ball 30 and the closures 14 and 16. Specifically, in the open position, the seats 58 provide a seal between the bore 32 and the bores 28 and 34 of the closures 14 and 16, respectively. Conversely, in the closed position, the seats 58 provide a seal between the ball 30 and the bores 28 and 34 of the closures 14 and 16, respectively. This configuration may substantially reduce or eliminate fluid leakage within the valve 10.

As previously discussed, the trunnion bearing 44 is disposed about the trunnion 40 to facilitate rotation of the ball 30 within the body 12. As illustrated, the trunnion bearing 44 is disposed between the trunnion 40 and the opening 47 within the trunnion block 42. As will be appreciated, the outer diameter of the bearing 44 may be substantially similar to the inner diameter of the opening 47. Similarly, the inner diameter of the bearing 44 may be substantially similar to the outer diameter of the trunnion 40. This configuration may both tightly secure the ball 30 within the valve 10, and enable the ball 30 to rotate with respect to the trunnion block 42. The trunnion block 42 is rigidly mounted within the body 12. As illustrated, the trunnion block 42 includes two tapered sections 62 configured to substantially match the inner contours of the cylindrical body 12. Because the dimensions of the ball 30 are configured to position the trunnion blocks 42 and 43 against the inner surface of the body 12, the tapered sections 62 serve to limit movement of the trunnion blocks 42 and 43 relative to the body 12. In addition, the trunnion block 42 includes recesses 64 configured to receive pins extending from the closures 14 and 16. These pins serve to further limit movement of the trunnion block 42. While one recess 64 is illustrated on one axial side of the trunnion block 42 in the present embodiment, it will be appreciated that a similar recess 64 may be disposed on the opposite axial side. Furthermore, alternative embodiments may include more or fewer recesses 64 configured to engage respective pins. For example, certain embodiments may include 1, 2, 3, 4, 5, 6, or more recesses 64 disposed on each axial side of the trunnion block 42. Furthermore, a similar pin and recess configuration may be employed on the second trunnion block 43.

As previously discussed, the dowels 38 may serve to rotationally couple the stem 22 to the ball 30. Specifically, the stem 22 includes recesses 66 configured to receive the dowels 38. As illustrated, a diameter of the recesses 66 may substantially coincide with a diameter of the dowels 38 such that the dowels 38 may mount securely within the recesses 66. The ball 30 includes a similar pair of corresponding recesses 68 disposed within an opening 69, and configured to receive the dowels 38. Similar to the recesses 66, a diameter of the recesses 68 may substantially coincide with the diameter of the dowels 38. In this configuration, when the dowels 38 are disposed within the recesses 66 and 68, the stem 22 may be rotationally coupled to the ball 30 such that rotation of the stem 22 induces the ball 30 to rotate.

Furthermore, the thrust bushing 48 and thrust washer 50 are illustrated. As previously discussed, the thrust bushing 48 and thrust washer 50 are disposed about the stem 22 and facilitate rotation of the stem 22. In addition, the retainer 54 is also disposed about the stem 22 and limits movement of the stem 22 in the inward radial direction 52. In the present embodiment, the retainer 54 is a two-piece split ring having a first c-shaped segment 70 and a second c-shaped segment 72. As will be appreciated, further embodiments may include other retainer configurations such as split rings having three or more segments, dowels, pins, fasteners or other suitable retainer configurations. As discussed in detail below, the ring segments 70 and 72 may be disposed within an annular recess of the stem 22. In such a configuration, contact between the retainer 54 and the body 12 may block movement of the stem 22 in the inward radial direction 52. However, once the ring segments 70 and 72 have been removed, the stem 22 may pass through the body 12, trunnion block 42, trunnion 40, and into the bore 32 of the ball 30. Because the length of the stem 22 may be less than an inner diameter of the ball 30, the stem 22 may be positioned entirely within the ball 30 after the retainer 54 has been disengaged. Consequently, the stem 22 may be removed from the valve 10 without uncoupling the closures 14 and/or 16. In this manner, maintenance operations may be performed on the stem 22, seals, bushings, washers or other components within the valve 10 in less time than maintenance operations on a valve configuration in which the closures 14 and/or 16 are removed prior to servicing the internal valve components.

Figure 4:
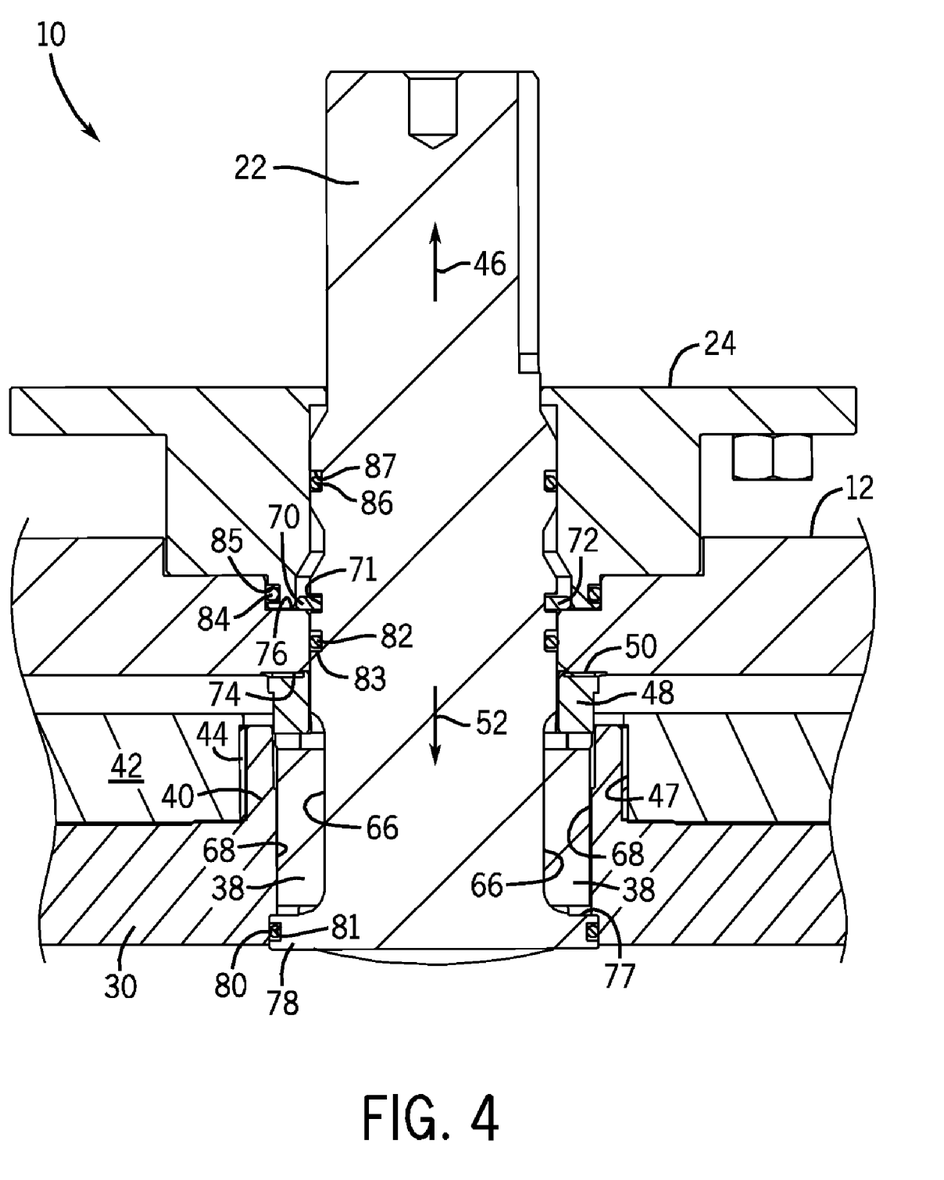
FIG. 4 is a detailed cross section of an exemplary ball valve, taken within line 4-4 of FIG. 2, in accordance with certain embodiments of the present technique.

FIG. 4 is a detailed cross section of an exemplary ball valve 10, taken within line 4-4 of FIG. 2. As previously discussed, movement of the stem 22 along the outward radial direction 46 is blocked by contact between the stem 22 and an inner surface 74 of the body 12. Specifically, the thrust bushing 48 and thrust washer 50 transfer the outward load from the stem 22 to the body 12 via contact with the inner surface 74. Conversely, movement of the stem 22 in the inward radial direction 52 is blocked by contact between the retainer 54 and an outward surface 76 of the body 12. Specifically, the first ring segment 70 and the second ring segment 72 of the retainer 54 are disposed within an annular recess 71 of the stem 22. Consequently, contact between the recess 71, the retainer 54 and the outer surface 76 of the body 12 blocks radial movement of the stem 22.

In the illustrated embodiment, the stem 22 includes a flange 78 configured to block a flow of fluid between the ball 30 and the stem 22. As previously discussed, the fluid pressure within the ball 30 exerts a force on the stem 22 in the direction 46. Consequently, the force is resisted by contact between the stem 22 and the body 12 via the thrust bushing 48 and thrust washer 50. In addition, a gap 77 is provided between the stem flange 78 and ball 30 such that the stem 22 does not apply a force to the ball 30 in the direction 46. As will be appreciated, if a substantial force is applied to the ball 30 in the direction 46, the ball 30 may become misaligned within the body 12, thereby establishing leaks within the seats 58 or other components of the valve 10. Therefore, the gap 77 facilitates movement of the stem 22 in the direction 46 without varying the alignment of the ball 30. In addition, an o-ring or other seal 80 is provided within a recess 81 of the flange 78. The seal 80 may serve to further block the flow of fluid from the ball 30.

Similar to the seal 80 within the flange 78, other seals may be provided to block fluid from flowing between the ball 30 and the stem 22. Specifically, an o-ring or other seal 82 may be disposed within a recess 83 of the stem 22. The seal 82 may block fluid from passing between the stem 22 and body 12. In addition, another o-ring or other seal 84 may be disposed within a recess 85 of the adapter plate 24. The seal 84 may block fluid from passing between the adapter plate 24 and the body 12. Furthermore, an o-ring or other seal 86 may be disposed within a recess 87 of the stem 22. The seal 86 may block fluid from passing between the stem 22 and the adapter plate 24. The combination of these seals may serve to substantially reduce or eliminate fluid leakage from the valve 10. In addition, in the event of leakage, the seals 84 and 86 may be easily replaced by removal of the adapter plate 24 as a temporary repair without disassembly of the valve 10.

In certain configurations, the seals 80, 82, 84 and 86 may be rubber o-rings. As will be appreciated, rubber may degrade over time, thereby reducing the effectiveness of the seals. Consequently, the seals may be periodically replaced to ensure proper valve integrity and operation. While the seals 84 and 86 may be accessed by removing the adapter plate 24, seals 80 and 82 may not be accessible without removal of the stem 22. As previously discussed, the stem 22 may be removed by extracting the ring segments 70 and 72 from the recess 71. The stem 22 may then be moved along the direction 52 into the bore 32 of the ball 30. At that point, the stem 22 may be removed from the valve 10 without uncoupling the closures 14 and/or 16, thereby decreasing the duration of maintenance operations compared to configurations in which the ball 30 is removed to access the stem 22. After the stem 22 has been removed, the seals 80 and 82 may be replaced, thereby ensuring proper operation of the ball valve 10.

Figure 5:
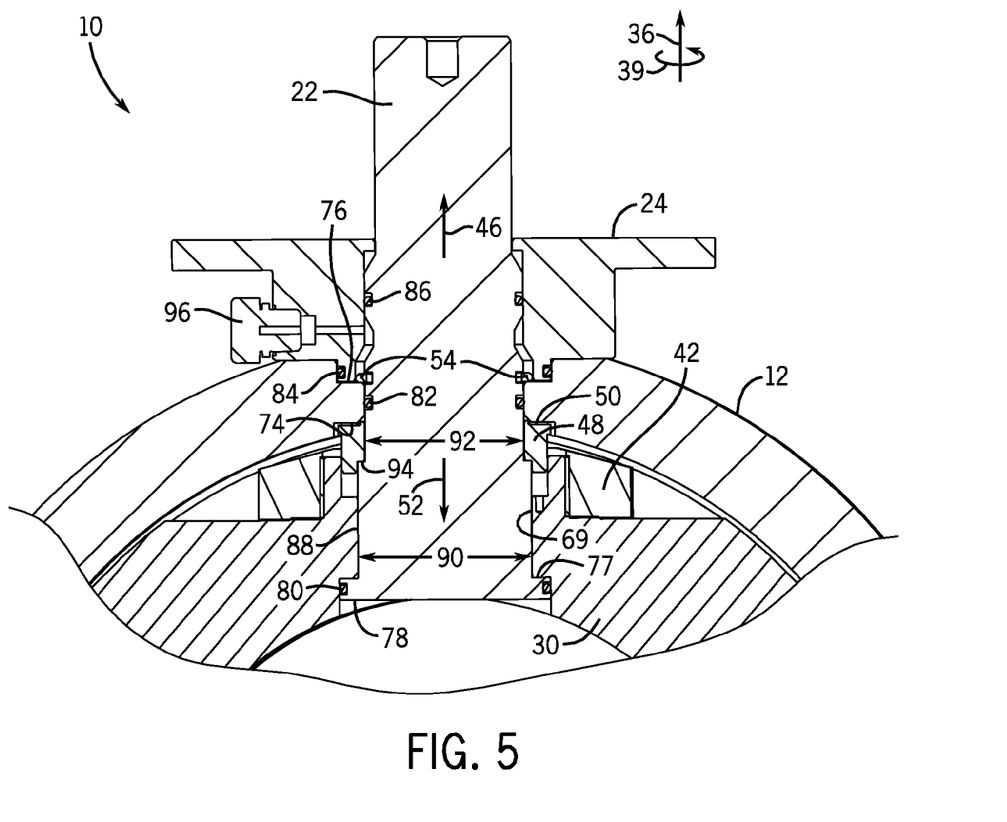
FIG. 5 is a cross section of an exemplary ball valve, taken along line 5-5 of FIG. 1, in accordance with certain embodiments of the present technique.

FIG. 5 is a cross section of an exemplary ball valve 10, taken along line 5-5 of FIG. 1. As illustrated, the stem 22 includes a raised portion 88 positioned at an inward side (i.e., along the inward radial direction 52) of the stem 22 adjacent to the flange 78. A diameter 90 of the raised portion 88 is larger than a diameter 92 of an outward portion (i.e., along the outward radial direction 46) of the stem 22. The difference in diameters 90 and 92 establishes a ridge 94 (e.g., annular abutment surface) that extends about the stem 22 in the circumferential direction 39. Due to the radial position (i.e., position along the radial direction 36) of the ridge 94, the recesses 66 configured to receive the dowels 38 form gaps within the ridge 94. Consequently, the ridge 94 is not visible in FIG. 2 (i.e., the cross section taken along line 2-2 of FIG. 1). The ridge 94 serves to establish a mounting point for the thrust bushing 48 and thrust washer 50. Specifically, force applied to the stem 22 in the direction 46 due to fluid pressure within the ball 30 is resisted by contact between the ridge 94 and the thrust bushing 48. The thrust bushing 48, in turn, applies a force to the thrust washer 50, which is resisted by contact with the inner surface 74 of the body 12. In this manner, any force applied to the stem in the direction 46 is transferred from the stem 22 via the ridge 94 to the body 12. This configuration blocks movement of the stem 22 in the direction 46 even when the retainer 54 has been removed. Consequently, the stem 22 may not be ejected from the valve 10 during maintenance operations due to residual fluid pressure within the ball 30. However, once the retainer 54 has been removed, the stem 22 may move in the inward radial direction 52 and enter the ball 30. As previously discussed, because the length of the stem 22 is limited with respect to a diameter of the bore 32, the stem 22 may be removed from the valve 10 without uncoupling the closures 14 and/or 16, thereby significantly reducing the duration and costs associated with maintenance operations. Furthermore, as illustrated, the valve 10 includes a vent 96 configured to release pressure within the valve 10 prior to removing the stem 22.

Figure 6:
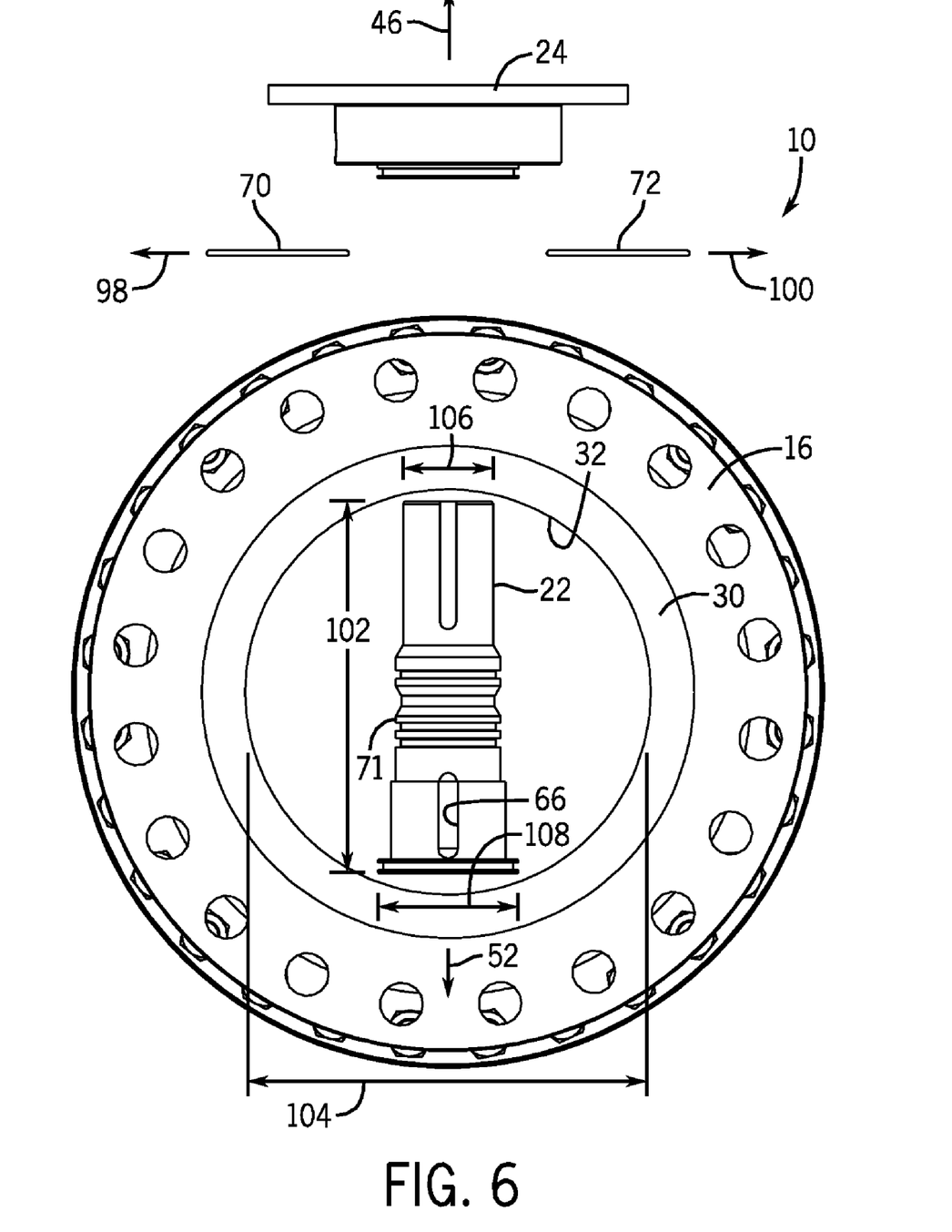
FIG. 6 is an exploded view of an exemplary ball valve, as shown in FIG. 1, in accordance with certain embodiments of the present technique.

FIG. 6 is an exploded view of an exemplary ball valve 10, as shown in FIG. 1, illustrating the steps of removing the stem 22 from the valve 10. First, the adapter plate 24 is uncoupled from the valve 10 and moved in the direction 46 to expose the retainer 54. As previously discussed, in the present embodiment, the retainer is a two-piece split ring including the first segment 70 and the second segment 72. As illustrated, the first segment 70 may be removed from the groove 71 along the direction 98, and the second segment 72 may be removed from the groove 71 along the direction 100. With the retainer 54 uncoupled from the stem 22, the stem 22 may move in the inward radial direction 52 into the bore 32 of the ball 30. As illustrated, a length 102 of the stem 22 is less than a diameter 104 of the bore 32. In addition, the length 102 is selected such that the stem 22 may be positioned within the bore 32 without contact between the stem 22 and the bore 32 despite an outward end (i.e., end along the outward radial direction 46) of the stem 22 having a diameter 106 and an inward end (i.e., end along the inward radial direction 52) of the stem 22 having a diameter 108. In other words, the length 102 is selected such that the stem 22 having particular dimensions may fit within the bore 32 of the ball 30. In this manner, the stem 22 may be removed from the valve 10 by moving the stem in the axial direction 27 through either closure 14 or 16. In this manner, the stem 22 may be removed from the valve 10 without uncoupling the closures 14 and/or 16 from the body 12, thereby reducing the duration and costs associated with valve maintenance.

When the stem 22 passes through the body 12 and into the bore 32 of the ball 30, the seals 80, 82, and 86 may remain attached to the stem 22. Specifically, seal 80 may remain within the recess 81, seal 82 may remain within the recess 83, and seal 86 may remain within the recess 87. In this manner, the seals 80, 82, and 86 may be easily removed from the stem 22 and replaced during the maintenance operation. In addition, removal of the stem 22 may cause the dowels 38 to enter the bore 32, either individually or attached to the stem 22. The dowels 38 may also be removed from the bore 32 through the closures 14 and/or 16. To reassemble the valve 10, the dowels 38 may be disposed within the recesses 66 of the stem 22. The stem 22 may then be aligned with the first trunnion 40 and moved into operating position along the direction 46. The retainer segments 70 and 72 may then be disposed within the recess 71, thereby securing the stem 22 to the body 12. Finally, the adapter plate 24 may be moved into position along the direction 52. In this manner, the stem 22 may be installed within the valve 10 without uncoupling either closure 14 or 16 from the body 12. Due to the large number of fasteners 18 associated with the closures 14 and 16, removing and installing the stem 22 without uncoupling the closures 14 and/or 16 may significantly reduce the duration and costs associated with valve maintenance operations.

Figure 7:
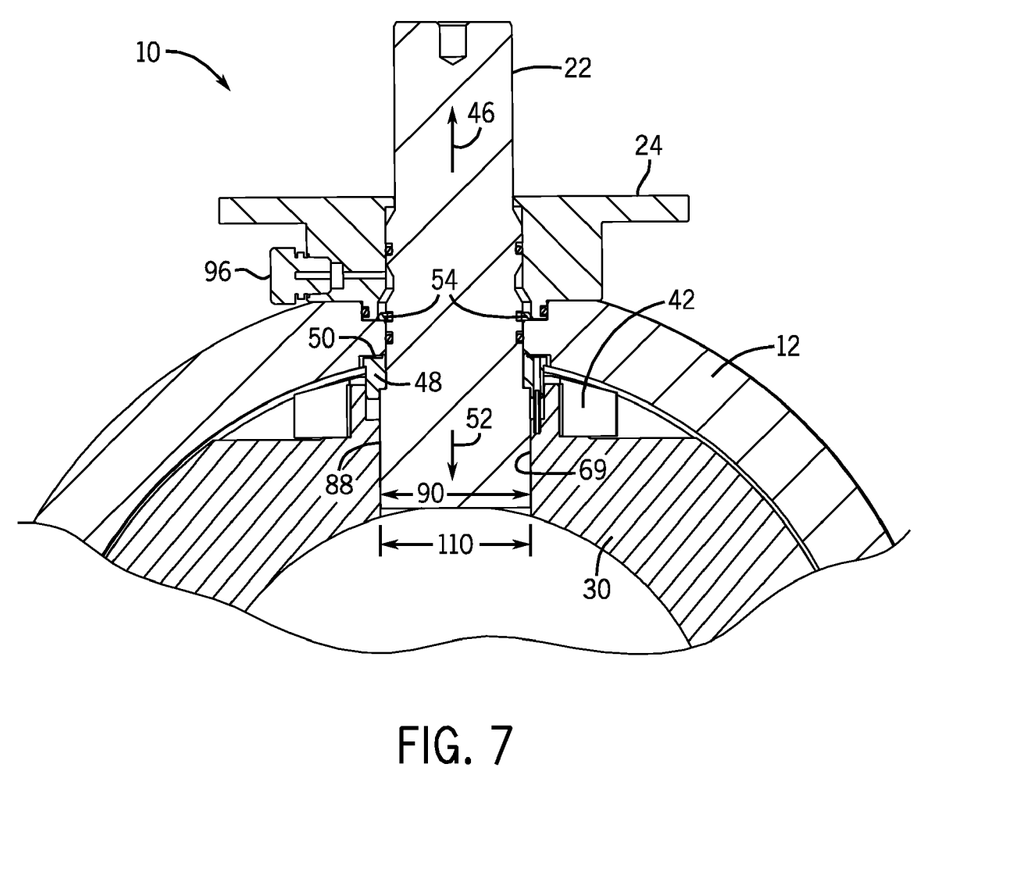
FIG. 7 is a detailed cross section of an alternative ball valve in accordance with certain embodiments of the present technique.

FIG. 7 is a detailed cross section of an alternative ball valve 10, including a different stem configuration. Specifically, the stem 22 in the illustrated embodiment omits the flange 78, seal 80 and recess 81 illustrated in the embodiment described with regard to FIG. 4. In the present configuration, the diameter 90 of the raised portion 88 is substantially equal to a diameter 110 of the opening 69. Consequently, fluid flow from the ball 30 may be blocked by contact between the stem 22 and the opening 69. Alternatively, pressure between the valve cavity (e.g., area between the ball 30 and body 12) and the bore 32 may equalize when the valve is open because the seal 80 is omitted. As will be appreciated, because the present configuration does not include the flange 78, manufacturing costs associated with machining the stem 22 may be reduced. However, in the illustrated embodiment, the stem 22 may be removed from the valve 10 in a similar manner to the procedure described above with regard to FIG. 6. Specifically, the adapter plate 24 may be removed, exposing the retainer 54. Removal of the retainer 54 facilitates movement of the stem 22 in the direction 52. Because the diameter 90 of the raised portion 88 is substantially equal to the diameter 110 of the opening 69, the stem 22 may pass through the opening 69 and into the ball 30. Consequently, the stem 22 may be removed without uncoupling the closures 14 and 16, thereby reducing the duration and costs associated with valve maintenance operations.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
 a ball valve, comprising:
  a body having a first opening;
  a ball disposed within the body; and
  a stem extending through the first opening in the body and into a second opening in the ball, wherein the stem comprises a ridge that blocks movement of the stem relative to the body in a first direction away from the ball without blocking movement of the stem relative to the ball in the first direction, and a retainer removably coupled to the stem that blocks movement of the stem in a second direction toward the ball via contact with an outer surface of the body, wherein the stem is removable by passage through the second opening in the ball and into a bore of the ball.

2. The system of claim 1, wherein a length of the stem is limited to facilitate removal through the bore of the ball.

3. The system of claim 1, wherein the retainer comprises a two-piece split ring.

4. The system of claim 1, wherein the ball valve comprises a thrust bushing, a thrust washer, or a combination thereof, disposed between the ridge and an inner surface of the body.

5. The system of claim 1, comprising at least one dowel disposed between the stem and the ball, wherein the dowel is configured to rotationally couple the stem and the ball.

6. The system of claim 1, wherein the stem comprises a flange configured to block a flow of fluid through the second opening in the ball.

7. The system of claim 1, comprising a seal disposed between the stem and the body, wherein the seal is configured to block a flow of fluid out of the body.

8. A system comprising:
 a ball valve, comprising:
  a body having a first opening;
  a ball disposed within the body; and
  a stem extending through the first opening in the body and into a second opening in the ball, wherein the stem comprises a ridge that blocks movement of the stem relative to the body in a direction away from the ball without blocking movement of the stem relative to the ball in the direction away from the ball, wherein the stem is removable by passage through the second opening in the ball and into a bore of the ball.

9. The system of claim 8, wherein a length of the stem is limited to facilitate removal through the bore of the ball.

10. The system of claim 8, comprising a thrust bushing, a thrust washer, or a combination thereof, disposed between the ridge and an inner surface of the body.

11. The system of claim 8, wherein the stem is rotationally coupled to the ball by at least one dowel disposed within a recess of the stem and a corresponding recess within the ball.

12. A system comprising:
 a ball valve comprising:
  a body;
  a ball disposed within the body; and
  a stem disposed within an opening in the ball, wherein the stem comprises a ridge that blocks radially outward movement of the stem relative to the body without blocking radial movement of the stem relative to the ball, wherein the stem is removable by passage through the opening into a bore of the ball.

13. The system of claim 12, comprising a removable retainer coupled to the stem, wherein the removable retainer is configured to block radially inward movement of the stem toward the ball by contact with an outer surface of the body.

14. The system of claim 13, wherein the retainer comprises a two-piece split ring.

15. The system of claim 12, wherein a diameter of the stem is substantially equal to a diameter of the opening.

16. The system of claim 12, wherein a length of the stem is less than a diameter of the bore of the ball.

17. The system of claim 1, wherein the ridge comprises an annular abutment surface.

18. The system of claim 8, wherein the ridge comprises an annular abutment surface.

19. The system of claim 8, comprising a seal disposed between the stem and the body, wherein the seal is configured to block a flow of fluid out of the body.

20. The system of claim 12, wherein the ridge comprises an annular abutment surface.

* * * * *